(12) United States Patent
Zinser

(10) Patent No.: US 8,306,171 B2
(45) Date of Patent: Nov. 6, 2012

(54) METHOD AND SYSTEM FOR BIT DETECTION AND SYNCHRONIZATION

(75) Inventor: Richard Louis Zinser, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 875 days.

(21) Appl. No.: 12/424,071

(22) Filed: Apr. 15, 2009

(65) Prior Publication Data

US 2010/0266079 A1 Oct. 21, 2010

(51) Int. Cl.
*H04L 7/00* (2006.01)
(52) U.S. Cl. ........................................ 375/355; 327/141
(58) Field of Classification Search .................. 375/354, 375/360, 364, 363, 365, 368, 372, 377; 327/141; 370/503
See application file for complete search history.

(56) References Cited

U.S. PATENT DOCUMENTS

| | | | |
|---|---|---|---|
| 4,227,175 A * | 10/1980 | Newman | 340/146.2 |
| 4,453,550 A | 6/1984 | Flax | |
| 5,644,600 A * | 7/1997 | Kawai | 375/286 |
| 6,058,150 A | 5/2000 | Ghosh | |
| 6,243,431 B1 | 6/2001 | Han | |
| 6,711,220 B1 * | 3/2004 | Yoshida et al. | 375/354 |
| 6,850,580 B1 * | 2/2005 | Naoe | 375/355 |
| 7,453,926 B2 * | 11/2008 | Chen et al. | 375/149 |
| 2002/0039027 A1 | 4/2002 | Hung | |
| 2008/0164914 A1 | 7/2008 | Bayadroun | |

OTHER PUBLICATIONS

S.Z. Hsue, Samir S. Soliman; Automatic modulation classification using zero crossing; IEE Proceedings, vol. 137, Pt. F, No. 6, Dec. 1990; pp. 459-464.

* cited by examiner

*Primary Examiner* — Jean B Corrielus
(74) *Attorney, Agent, or Firm* — Ann M. Agosti

(57) ABSTRACT

A bit synchronization method is proposed. The method includes buffering a plurality of samples from a signal stream, scanning the buffered samples for transitions and updating a zero-crossing histogram buffer upon detection of the transitions. The method further includes detecting at least two peaks simultaneously from the updated zero-crossing histogram buffer, fixing at least two boundaries from the detected peaks, and integrating the buffered samples within the boundaries. Finally the method includes generating an output signal comprising a synchronized bit stream from the integrated samples.

17 Claims, 5 Drawing Sheets

METHOD AND SYSTEM FOR BIT DETECTION AND SYNCHRONIZATION

BACKGROUND

The subject matter disclosed herein generally relates to digital radio receivers and in particular to bit timing recovery methods and systems for such receivers.

In digital communication systems, transmission signals are produced by the modulation of a carrier signal with digital data to be transmitted. The digital data is commonly transmitted in packets wherein each packet includes a number of data bits. After the transmitted signal is received, the signal requires demodulation in order to recover the data.

Radio receiver architectures commonly employ direct conversion receivers, also known as zero-IF receivers, to perform the demodulation of a received signal. A local oscillator operating at the carrier signal frequency is used to mix down the received signal to produce in-phase (I) and quadrature (Q) baseband signals. The direct conversion receiver converts the incoming carrier signal directly to baseband, in both I and Q components, without use of any intermediate frequencies. Such direct conversion receiver implements a baseband processor which may have a DC offset compensation module and a bit synchronization module.

Bit synchronization arrangement techniques for a radio receiver often include sampling the signal at a constant rate and then normalizing the sampled signal. The adjacent normalized samples are compared to detect the positions of the transitions between signaling levels. The positions of the transitions are recorded and a buffer or counter associated with each position is incremented. For each received bit, the buffer location containing the most transitions is selected and the bit clock may be readjusted.

Another way to synchronize bits is through zero crossing based synchronization algorithms. However, such methods have certain disadvantages such as variation in the output when zero crossings occur during every bit time interval. Further, such techniques have bandwidth limitations, and mismatches between the transmitter and receiver clocks tend to cause the relative positions of the zero-crossing to drift over time.

Therefore, there is a need for an enhanced method and system for bit detection and synchronization.

BRIEF DESCRIPTION

Briefly, a bit synchronization method is proposed. The method includes buffering a plurality of samples from a signal stream, scanning the buffered samples for a transition, and updating a zero-crossing histogram buffer upon detection of the transition. The method further includes detecting at least two peaks simultaneously from the updated zero-crossing histogram buffer, fixing at least two boundaries from the detected peaks, and integrating the buffered samples between the boundaries. Finally the method includes generating an output signal comprising a synchronized bit stream from the integrated samples.

In one embodiment, a system for bit synchronization is proposed. The system includes a frame buffer to store samples from an input signal stream, a scanner to detect transitions in the signal stream, and an arithmetic logic unit and a summer to track number and position of the transitions. The system further includes a zero-crossing buffer to store a value proportional to the number of transitions according to the positions of samples in the frame buffer, a peak detector to detect peaks in the zero-crossing histogram buffer, and a marker to define boundaries from the detected peaks. The system also includes an integrator to integrate the frame buffer samples between the boundaries and a comparator to generate a synchronized output bit stream from the integrated samples.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
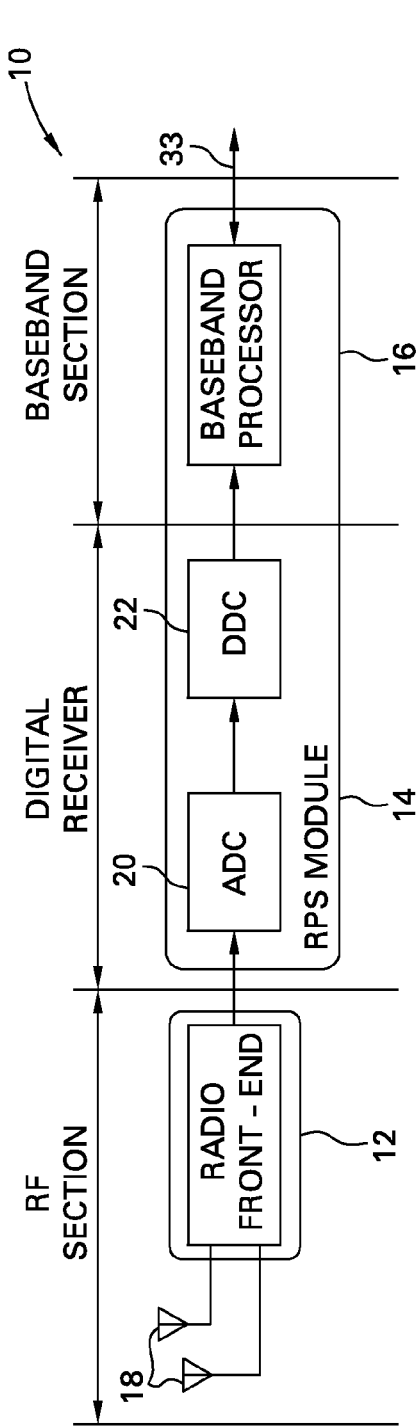
FIG. 1 is a block diagram of an exemplary digital radio receiver.

FIG. 1 is a block diagram of an exemplary digital radio receiver 10. Digital radio receiver 10 includes a radio front-end module 12, a digital receiver module 14, and a base-band processor 16. Radio front-end module 12 receives a radio signal and base-band processor 16 generates a de-modulated digital output signal 33.

Radio front-end module 12 is configured to amplify signals received from an antenna 18. Digital receiver module 14 includes an analog to digital converter 20 to convert the signals from radio front-end module 20 to digital signals. Digital receiver module 14 further includes a digital down converter 22 (DDC) to convert a digitized signal centered at a carrier frequency to a base-band signal centered at zero frequency. In addition to down conversion, DDCs typically decimate to a lower sampling rate, allowing further signal processing by lower speed processors.

Figure 2:
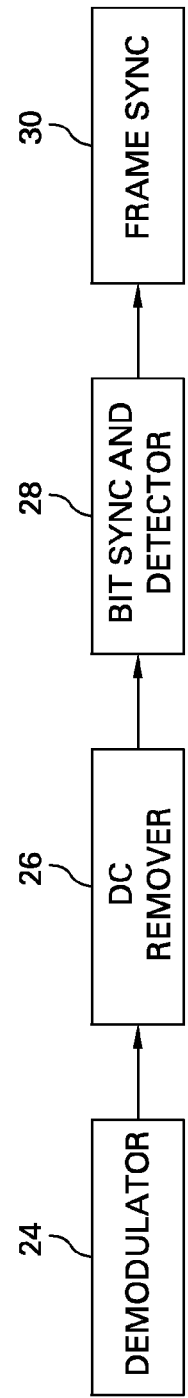
FIG. 2 is a block diagram of a base-band processor in accordance with an embodiment as implemented in the system of FIG. 1.

FIG. 2 is a block diagram of base-band processor 16 of FIG. 1. Base-band processor 16 includes a demodulator 24, a DC compensating module 26, a bit synchronization and detector unit 28, and a frame synchronization module 30. In a presently contemplated embodiment, base-band processor 16 may be implemented on any digital processing platform. Non-limiting examples of digital processing platforms include Digital Signal Processing (DSP) chips, Field Programmable Gate Arrays, or Application-specific integrated circuits (ASIC). Demodulator 24 may be configured to convert frequency variations in the input signal to a base-band waveform whose amplitude may be proportional to the input signal frequency. DC compensating module 26 is configured for removing DC-offset in the demodulated signal. Bit synchronization and detector 28 and frame synchronization module 30 are configured to recover the bit timing information in order to minimize the length of the header and to determine the location of a demarcated position within a detected bit stream.

In digital receivers, reception may occur in short bursts, separated by random length time intervals. Bit timing and frame synchronization recovery algorithms start at the beginning of each packet sample, so the bit-synchronizing header is therefore transmitted at the start of each packet. To minimize the length of the synchronizing header and thus reduce operational burden, it may be advantageous to recover the bit timing information as early as possible.

Typical zero crossing based synchronization algorithms have several disadvantages. Zero crossings may not occur during every bit time interval, and bandwidth limitations may cause the zero crossing points to vary, depending on the bit pattern. Further, mismatch between the transmitter and receiver clocks may cause the relative positions of the zero crossings to drift over time. Embodiments described herein use fast-converging, low complexity, histogram-based algorithms to overcome such shortcomings.

Figure 3:
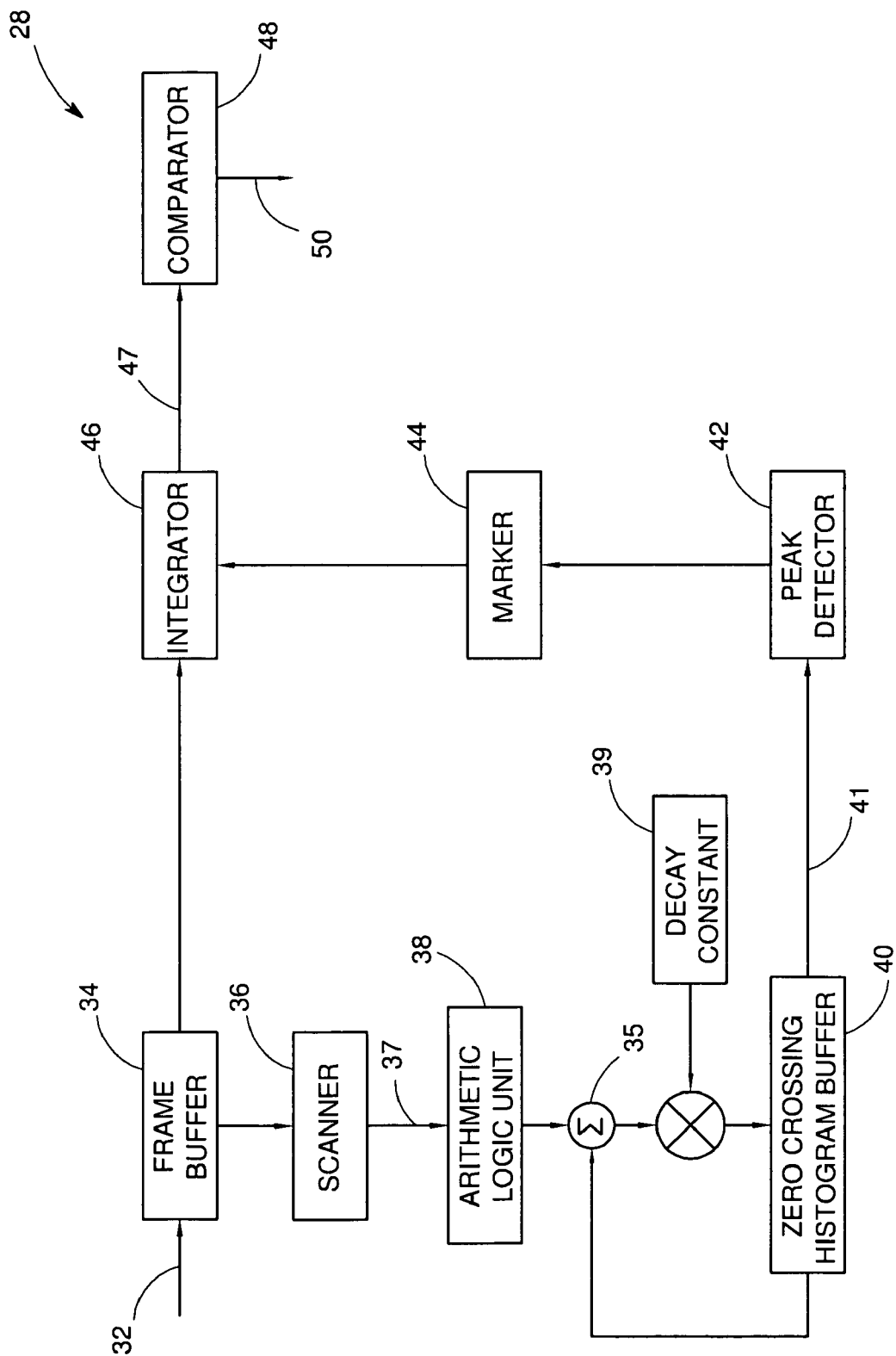
FIG. 3 is a block diagram of a bit detection system implementing a zero crossing histogram according to an aspect of the invention.

FIG. 3 is a block diagram of a bit detection system 28 implementing a zero crossing histogram according to an aspect of the invention. The bit detection system 28 includes a frame buffer 34 to store samples from an input signal stream 32. In one embodiment, the frame buffer 34 is configured as a first in first out (FIFO) buffer. A scanner 36 is coupled to the frame buffer to detect transitions in the signal stream 32. In one embodiment the scanner 36 comprises a zero-crossing detector. An arithmetic logic unit (ALU) 38 is coupled to the scanner 36 to track the position of the transitions in the signal stream 32. The arithmetic logic unit 38 outputs a fixed positive constant when a transition is detected, and a zero when there is no transition. For example, the fixed positive constant is "1" when a transition is detected. In one embodiment, a summer 35 is coupled to the arithmetic logic unit 38 to add progressively the number of transitions detected according to their positions in frame buffer 34. The count of number of transitions, which are stored separately for each position in the zero-crossing histogram buffer 40, effectively constitute a histogram of the zero crossing history of buffer 34. A peak detector 42 is coupled to the zero-crossing histogram buffer 40 and is configured to detect at least two peaks in the zero-crossing histogram. A marker 44 is coupled to the peak detector 42 and configured to define two boundaries according to the position of the detected peaks. An integrator 46 is coupled to the frame buffer 34 and the marker 44. Integrator 46 is configured to integrate (for example sum up) the samples between the boundaries (as defined by the marker 44) from the frame buffer 34. A comparator 48 is coupled to the integrator 46 to generate a synchronized output bit stream 50 from the integrated samples 47.

In one example of operation, the frame buffer 34 receives the input signal stream 32 by shifting in multiple samples, with the number of samples shifted equal to the number of samples per bit. Further, frame buffer 34 stores a plurality of samples. In an exemplary embodiment, the number of samples per bit is at least three samples; thus three samples would be shifted into the buffer at a time. In some embodiments the number of samples is predetermined, and in other embodiments the number of samples may be variable. It may be noted that as the samples are shifted into the buffer, the positions of the zero crossings (relative to the start of the buffer samples) are nearly stationary. Scanner 36 scans the samples for transitions and the positions of the transitions within the buffer 34. A transition may include the bits in the sample transiting from a digital "low" to a digital "high" or from a digital "high" to a digital "low." Based on the output 37 of the scanner 36, arithmetic logic unit 38 may output a digital "high" where a transition is detected and zero if there is no transition detected. A non-limiting example of digital "high" may include a positive voltage. Output 37 also includes the position of the transition relative to its position in buffer 34. Arithmetic logic unit 38 in combination with summer 35 counts and stores a value proportional to the number of transitions according to their positions provided by the output 37. In one embodiment, the summer 35 adds up the count values cumulatively for each position. Once a transition (zero-crossing) is detected in the buffered samples, a corresponding location in the zero-crossing histogram buffer 40 is incremented by a fixed positive constant. The value of the positive constant is chosen according to the arithmetic employed in the arithmetic logic unit/summer/histogram buffer loop. In a floating-point arithmetic configuration, for example, a value of 1.0 may be used. However, for fixed-point arithmetic configuration, a larger value may be required and chosen based on the bit width of the configuration. Further, each value in the zero-crossing histogram 40 is multiplied by a decay constant 39. The decay constant may be set to, for example, 0.99 if there were any zero-crossings detected, or 1.0 (unchanged) if there were no zero-crossings in the buffered samples.

The embodiment of FIG. 3 thus results in a cyclic repetitive loop of scanning the samples for zero-crossings, detecting the transitions according to their positions, incrementing the histogram buffer by a fixed positive constant at the location corresponding to the position of the transitions, and multiplying the values in the histogram buffer with a decay constant to form an autoregressive averaging loop. After a few iterations, distinct peaks may emerge in the histogram buffer.

Figure 4:
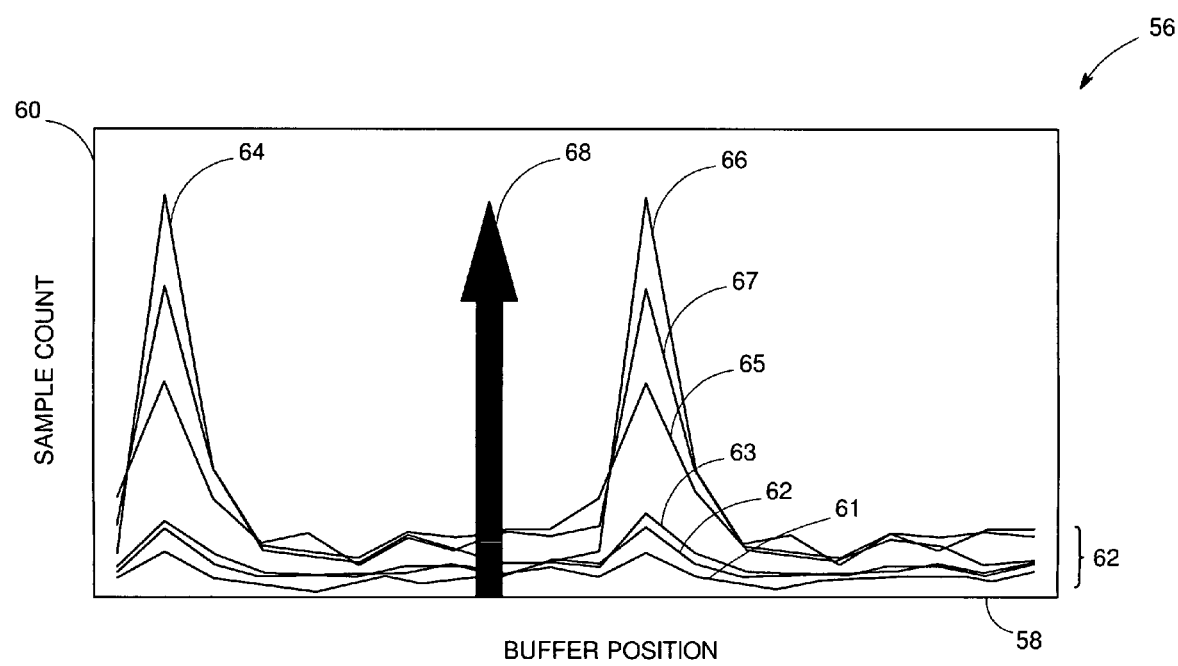
FIG. 4 is a graphical illustration of the zero-crossing histogram in accordance with an embodiment of the invention as implemented the system of FIG. 3.

FIG. 4 is a graphical illustration of the zero-crossing histogram according to an embodiment as implemented in FIG. 3. Histogram 56 may include a relative sample time (represented by the buffer position) on the horizontal axis 58 and a value proportional to number of transitions (from the histogram buffer 40 in FIG. 3) on the vertical axis 60. Initially, when a small number of input samples have been processed, the amplitude of the plot may not include any significant peaks, as illustrated by reference numeral 61, 62, 63. In the illustrated embodiment, 61, 62, 63 may include sample sizes representing 10, 25 and 50 bits respectively. As more input samples are processed with the passage of time (68), distinct peaks such as 65, 67 may start to emerge. Further, the peaks 64 and 66 may emerge after substantial number of samples has been processed, for example after about 300 bits.

Turning back to FIG. 3, the position-dependent values 41 from the zero-crossing histogram buffer 40 are fed to peak detector 42 which is configured to detect peaks from the histogram 56 (of FIG. 4). In one embodiment, the peak detector 42 is configured to detect at least two peaks simultaneously. Two peaks are detected simultaneously by using the bit time interval and adding the two histogram values that are spaced one bit time apart. The largest of the sums can then be selected. It is advantageous to detect two peaks simultaneously in order to reduce the number of comparisons for the detection. In addition, accuracy of the location detection improves, as the sum of the two values has a significantly higher signal-to-noise ratio than any single histogram value.

Figure 5:
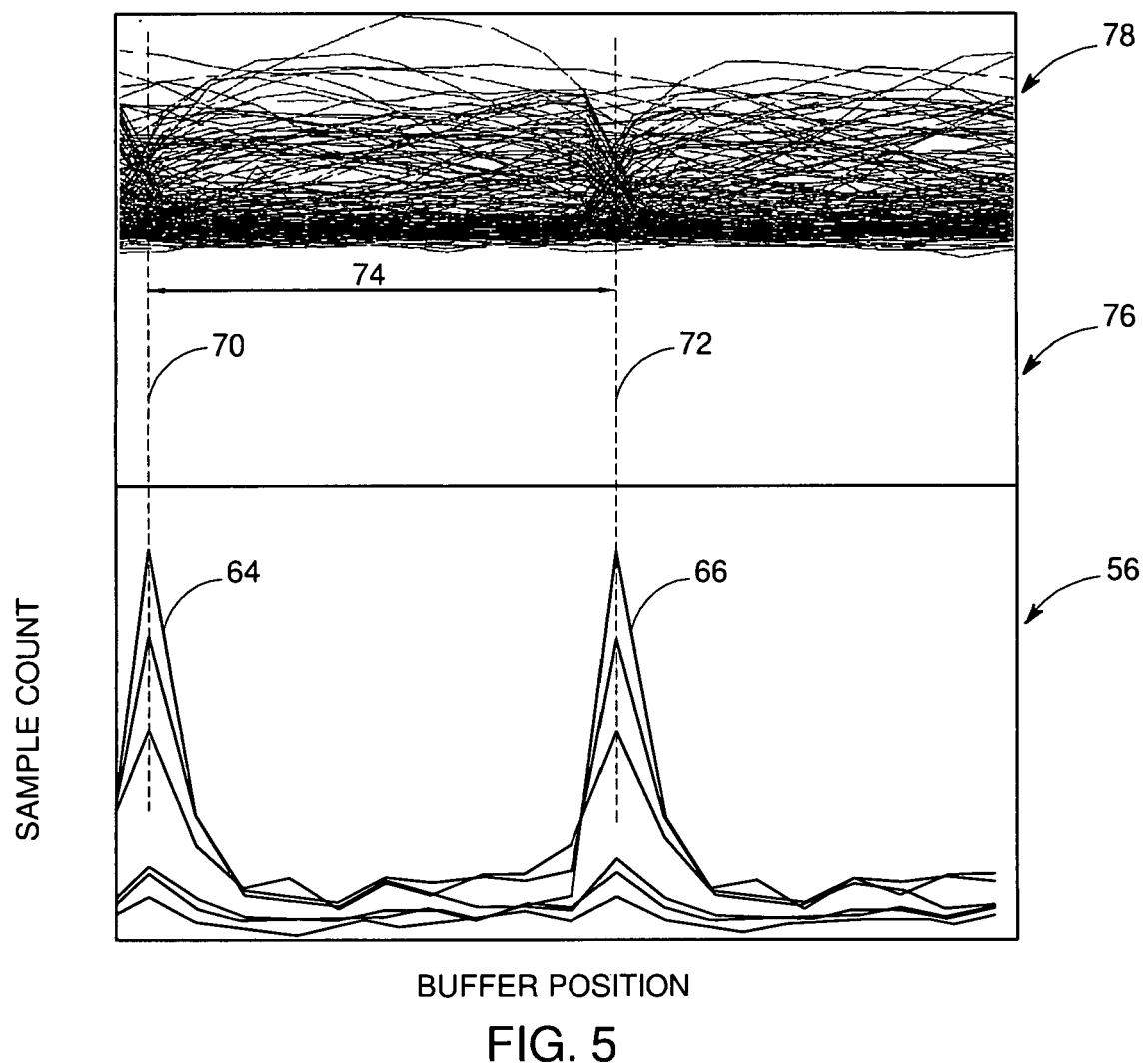
FIG. 5 illustrates a bit detection sequence according to an embodiment of the invention.

FIG. 5 illustrates a bit detection sequence according to an embodiment of the invention. The marker 44 (of FIG. 3) is configured to define two boundaries from the location of at least two peaks (detected at the peak detector 42 of FIG. 3). The boundaries 70, 72 for the samples define the bit time interval 74 as illustrated by the graph 76. It may be noted that the bit time interval 74 is derived from the distance between two peaks 64 and 66 from the zero-crossing histogram 56.

Based on the number of samples per bit, one or more samples in the frame buffer 34 may be used to detect the value of the bit. For example, if there are three or more samples per bit, then the value(s) of the center sample(s) can be added and the sum used to detect the bit value. Using multiple samples to detect the bit value may improve the performance considerably in a low signal-to-noise ratio environment (illustrated in graph 78). For example, center samples include samples that are not adjacent to the zero-crossings as evident in 78. In an exemplary embodiment, the integrator 46 referenced in FIG. 3 performs the operation of detecting the value of the bit described above.

Turning back to FIG. 3, the integrator 46 generates integrated samples 47 (as indicated in FIG. 5) that may be coupled to the comparator 48. Comparator 48 compares the samples 47 with a threshold value. One non-limiting example of threshold value is zero. In this embodiment, if the result of comparison is greater than the threshold value, '1' is output from the comparator; otherwise a '0' is output. The output bit stream 50 that includes a synchronized bit stream, may be coupled to a frame synchronization module for further processing in the digital receiver.

Figure 6:
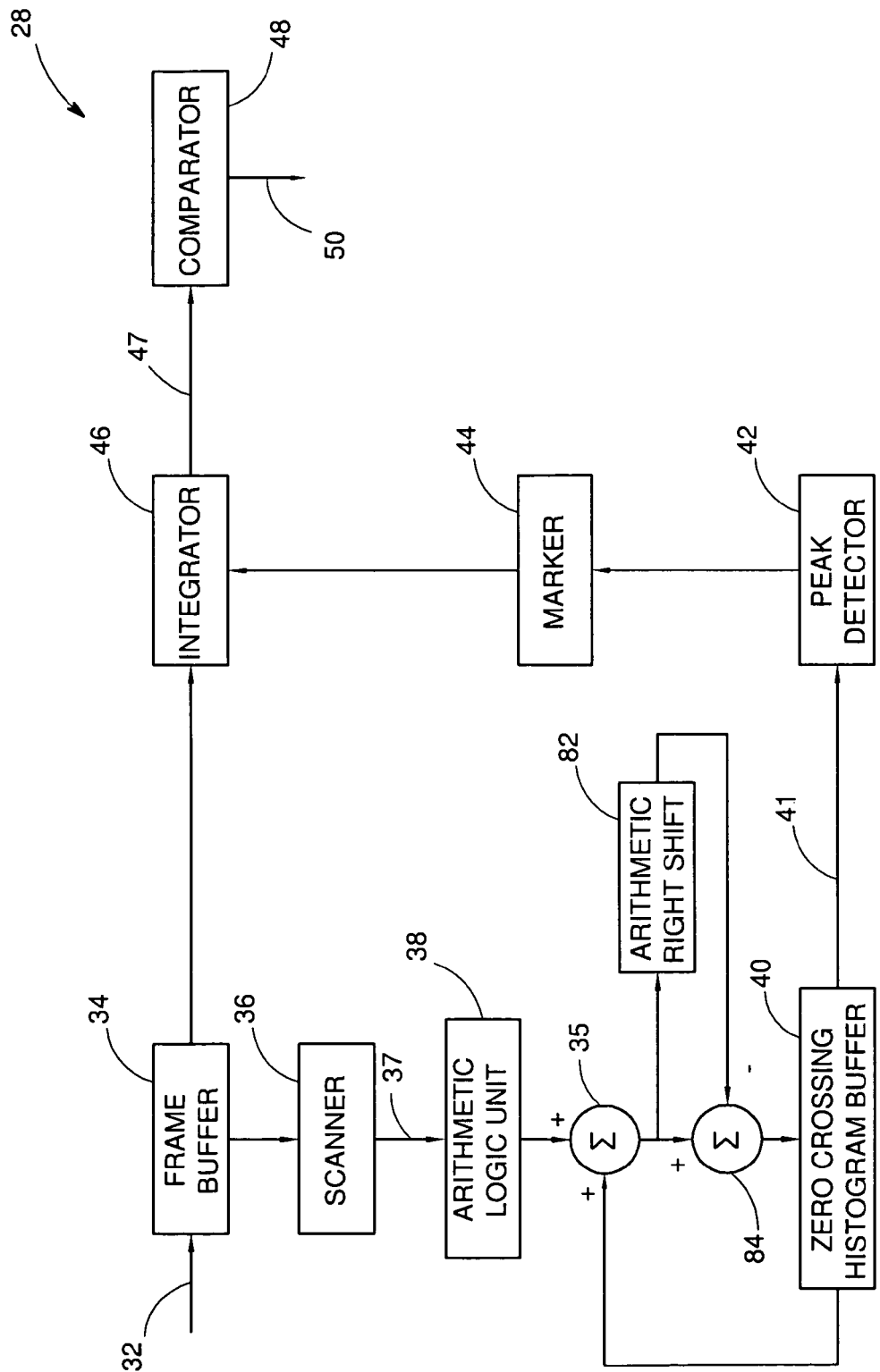
FIG. 6 is a block diagram of a bit detection system implementing a fixed point zero crossing histogram according to an aspect of the invention.

In an alternate embodiment, a fixed-point averaging loop may replace the autoregressive loop in FIG. 3. FIG. 6 is a block diagram of a bit detection system implementing a fixed point zero crossing histogram according to an aspect of the invention. The working of various blocks is similarly to the system 28 described in FIG. 3. However in such configurations, the decay constant is be replaced by an arithmetic shift 82 and a subtractor 84. The combination of blocks 82, 84 may perform the function of multiplication by a fixed constant that is less than one. The arithmetic shift block 82 right shifts the samples bitwise. As is well known, right arithmetic shifts are equivalent to dividing a fixed point number by a power of 2. For example, if the output of summer 35 is shifted right by 7 bits, it is the same as dividing by 128 (or multiplying by 0.0078125). When the shifted number is subtracted from the original sample in subtractor 84, the result is the same as multiplying the output of summer 35 by 1.0-0.0078125 (0.9921875). This operation is performed if there were any zero-crossings detected, or alternatively, replaced by a multiplication of 1.0 (unchanged) if there were no zero crossings in the buffered samples.

Advantageously, such autoregressive and fixed-point averaging techniques develop a fast-converging, low complexity, histogram based algorithm. Further, such algorithms, when implemented in early stages of signal processing in digital radio receivers are advantageous in recovery of bit timing information quickly and minimizing the length of overhead processing downstream. Zero-crossing based histograms reduce errors in detection that might otherwise occur (1) when transitions do not occur during every bit period; (2) when bandwidth limitations cause the zero crossing points to vary depending on the bit pattern; and (3) when mismatch occurs between the transmitter and receiver clocks that may cause the relative positions of the zero-crossing to drift over time.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A bit synchronization method comprising:
 buffering a plurality of samples from a signal stream;
 scanning the buffered samples for transitions;
 updating a zero-crossing histogram buffer upon detection of the transitions;
 detecting at least two peaks simultaneously from the updated zero-crossing histogram buffer;
 fixing at least two boundaries from the detected peaks;
 integrating the buffered samples between the boundaries; and
 generating an output signal comprising a synchronized bit stream from the integrated samples.

2. The method of claim 1, wherein the plurality of samples comprises at least three samples.

3. The method of claim 1, wherein buffering of the samples comprises a first in first out (FIFO) operation.

4. The method of claim 1, wherein updating of the zero-crossing histogram buffer comprises incrementing a value in the zero-crossing histogram buffer.

5. The method of claim 4, wherein updating of the zero-crossing histogram buffer further comprises multiplying the count in the zero-crossing histogram by a decay constant upon detecting the transitions.

6. The method of claim 1, further comprising defining a bit time interval by detecting two peaks simultaneously.

7. The method of claim 6, wherein the boundaries are spaced by the bit time interval.

8. The method of claim 1, wherein generating the output signal comprises comparing the integrated samples with a threshold value.

9. A system for bit synchronization comprising:
 a frame buffer to store samples from an input signal stream;
 a scanner to detect transitions in the signal stream;
 an arithmetic logic unit and summer to track number and position of the transitions;
 a zero-crossing histogram buffer to store a value proportional to the number of transitions according to the positions;
 a peak detector to detect peaks in the zero-crossing histogram buffer;
 a marker to define boundaries from the detected peaks;
 an integrator to integrate the frame buffer samples between the boundaries;
 a comparator to generate a synchronized output bit stream from the integrated samples.

10. The system of claim 9, wherein frame buffer comprises a first in first out (FIFO) buffer.

11. The system of claim 9, wherein the scanner, the arithmetic logic unit, and the summer operate in parallel for a plurality of samples.

12. The system of claim 9, wherein the scanner comprises a zero crossing detector.

13. The system of claim 12, wherein the zero crossing detector is configured to detect transitions.

14. The system of claim 13, wherein the transitions comprise bit samples transiting from low to high or high to low.

15. The system of claim 9, wherein the peak detector is configured to detect at least two peaks simultaneously.

16. The system of claim 9, wherein the comparator is configured to compare the integrated samples with a threshold value.

17. The system of claim 9 further comprising a multiplier to multiply a decay constant by the values in the zero-crossing histogram.

* * * * *